United States Patent
Perlin et al.

(10) Patent No.: US 12,409,615 B2
(45) Date of Patent: Sep. 9, 2025

(54) METHOD FOR MANUFACTURING A COMPOSITE PART FOR A TURBOMACHINE

(71) Applicant: SAFRAN AIRCRAFT ENGINES, Paris (FR)

(72) Inventors: Matthieu Patrick Jean Roger Perlin, Moissy-Cramayel (FR); Arthur Bouchaud, Moissy-Cramayel (FR); Romain Plante, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 307 days.

(21) Appl. No.: 18/001,769

(22) PCT Filed: Jun. 10, 2021

(86) PCT No.: PCT/FR2021/051042
§ 371 (c)(1),
(2) Date: Dec. 14, 2022

(87) PCT Pub. No.: WO2021/255368
PCT Pub. Date: Dec. 23, 2021

(65) Prior Publication Data
US 2023/0311428 A1 Oct. 5, 2023

(30) Foreign Application Priority Data

Jun. 18, 2020 (FR) ...................................... 2006391

(51) Int. Cl.
*B29C 70/24* (2006.01)
*B29C 37/00* (2006.01)
(Continued)

(52) U.S. Cl.
CPC .......... *B29C 70/24* (2013.01); *B29C 37/0025* (2013.01); *B29C 70/443* (2013.01); *B29C 70/545* (2013.01); *B29L 2031/082* (2013.01)

(58) Field of Classification Search
None
See application file for complete search history.

(56) References Cited

U.S. PATENT DOCUMENTS

| | | | |
|---|---|---|---|
| 4,637,904 A * | 1/1987 | Rounds | G11B 7/263 264/2.3 |
| 5,034,356 A * | 7/1991 | Brun | C04B 35/593 156/89.27 |

(Continued)

FOREIGN PATENT DOCUMENTS

| | | | |
|---|---|---|---|
| CN | 102990942 A | 3/2013 | |
| FR | 2914877 A1 * | 10/2008 | ............. B29C 70/30 |

(Continued)

OTHER PUBLICATIONS

International Search Report mailed Sep. 2, 2021, issued in corresponding International Application No. PCT/FR2021/051042, filed Jun. 10, 2021, 6 pages.

(Continued)

*Primary Examiner* — Joseph S Del Sole
(74) *Attorney, Agent, or Firm* — CHRISTENSEN O'CONNOR JOHNSON KINDNESS PLLC

(57) ABSTRACT

A method for manufacturing a part made of composite material for a turbomachine, in particular of an aircraft, includes the steps of: b) arranging a preform made of fibers in a mold, c) injecting polymerizable resin into the mold, d) machining the part, and e) visually checking the part. Step b) is preceded by a step a) in which at least one compliance coating is deposited in the mold. The compliance coating has a calibrated thickness (X) and at least one visual aspect identifiable by an operator. The coating is configured to cover at least one area of the preform and to be rigidly attached thereto by the resin at the end of step c). Step e) includes verifying, by the operator, the presence of the aspect in the area.

18 Claims, 7 Drawing Sheets

(51) Int. Cl.
  *B29C 70/44* (2006.01)
  *B29C 70/54* (2006.01)
  *B29L 31/08* (2006.01)

(56) References Cited

U.S. PATENT DOCUMENTS

2010/0136309 A1  6/2010  Normand et al.
2021/0339485 A1  11/2021  Dunaud et al.

FOREIGN PATENT DOCUMENTS

| FR | 2 956 057 A1 | 8/2011 | |
|---|---|---|---|
| FR | 3 029 134 A1 | 6/2016 | |
| FR | 3 051 386 A1 | 11/2017 | |
| WO | WO-2020043980 A1 * | 3/2020 | ......... B29C 37/0092 |

OTHER PUBLICATIONS

Written Opinion mailed Sep. 2, 2021, issued in corresponding International Application No. PCT/FR2021/051042, filed Jun. 10, 2021, 5 pages.
English translation of Written Opinion mailed Sep. 2, 2021, issued in corresponding International Application No. PCT/FR2021/051042, filed Jun. 10, 2021, 5 pages.
International Preliminary Report on Patentability mailed Dec. 13, 2022, issued in corresponding International Application No. PCT/FR2021/051042, filed Jun. 10, 2021, 6 pages.
First Office Action, issued in corresponding Chinese Application No. 202180059910.5, filed Jan. 16, 2023, 4 pages.

* cited by examiner

METHOD FOR MANUFACTURING A COMPOSITE PART FOR A TURBOMACHINE

FIELD OF THE DISCLOSURE

The present disclosure relates to a method for manufacturing a part made of composite material for a turbomachine, in particular an aircraft.

BACKGROUND

The prior art comprises in particular the documents FR-A1-2 956 057, FR-A1-3 029 134, FR-A1-3 051 386, WO-A1-2020/043980 and FR-A1-2 914 877.

The use of composite materials is advantageous in the aeronautical industry in particular because these materials have interesting mechanical performances for relatively low masses.

One method for manufacturing a composite part for the aeronautical industry, which is well known to the person skilled in the art, is the molding method RTM, the initials of which refer to the acronym Resin Transfer Molding.

This is a method for producing a part made of composite material based on resin-impregnated fibers. Such a method is used, for example, to manufacture a fan vane and comprises several successive steps illustrated in FIG. 1.

Firstly, the fibers are woven together to obtain a three-dimensional preform blank, and then the blank is cut-out to obtain a preform 10 which has substantially the same shape as the vane to be obtained. This preform is then arranged in an injection mold 12, which is closed. The resin is then injected in a liquid state by maintaining a pressure on the injected resin while the resin is polymerized by heating.

The resins used are very fluid resins that are able to penetrate the fibers of the preform well, even when injected under a reduced pressure. During the polymerization, under the effect of heat, the injected resin passes successively from the liquid state to the gelled state and finally to the solid state.

The composite material of the vane is relatively fragile, and in particular sensitive to the impacts, and it is known to be protected by means of a metal sheath 14 which is fitted and attached to the leading edge of the blade.

The sheath can be attached to the blade by positioning it on the preform 10 in the mold 12 so that it is secured to the vane by the resin. The injected resin impregnates the preform and comes into contact with the sheath to ensure its attachment to the blade after polymerization and curing.

After leaving the mold, the vane 16 undergoes several finishing operations. The vane 16 is demolded and deburred and undergoes a first machining operation by sandblasting S1 in order to adapt its surface condition to the next operation, which is a gluing step. Strips of anti-wear fabric and a polyurethane film (or even the sheath 14 if it has not already been glued) are glued to the vane 16. The vane 16 undergoes a second machining operation by sandblasting S2 in order to adapt its surface condition to the next operation. The vane 16 is coated with a bonding primer 18 and then with an anti-erosion paint 20 before undergoing a final machining step S3 by belt grinding or touching up.

In order not to damage the vane and in particular to guarantee its mechanical properties, a maximum thickness Emax of material removed by machining must not be exceeded, in particular on the molded intrados and extrados faces of the vane. This thickness is relatively small and for example less than or equal to 200 µm.

With the current technology, it is difficult to control the thickness of material removed during machining operations. One solution is to weigh the vane before and after each machining operation to calculate the mass of material removed and deduce the thickness of material removed based on the cumulative surface areas of the machined areas of the vane. However, this solution is not ideal because it assumes that the machining of these areas is homogeneous and that the thickness of material removed is constant in these areas, which is not necessarily the case and is difficult to check.

Furthermore, the mass of a vane is much greater than the mass of material removed by machining (which is approximately less than 0.01% of the mass of the vane). The solution cannot therefore be sufficiently precise and it is therefore necessary to take a safety margin by limiting, for example, the number of machining operations and in particular the number of sandblasting operations per vane. If we consider that a sandblasting operation generally removes a material thickness E and that the safety margin Ms adopted should be 50%, then the maximum number Nmax of machining operations per vane will be, for example:

$$Nmax = Ms.Emax/E = 50\%.Emax/E$$

For example, if Emax is 40 µm and E is 10 µm, the Nmax number of machining operations per vane is 2.

Therefore, the possible solutions of the present technique are not optimal for controlling the thicknesses of material removed during machining operations and the present disclosure proposes a solution to this problem, which is simple, effective and economical.

SUMMARY

The disclosure proposes a method for manufacturing a composite material part for a turbomachine, in particular of an aircraft, comprising the steps of:
b) arranging a preform made by weaving fibers in three dimensions in a mold,
c) injecting the polymerizable resin into the mold to impregnate the preform so as to form the part after solidification,
d) machining the part,
e) visually checking the part by an operator to validate at least one compliance criterion,
characterized in that the step b) is preceded by a step a) during which at least one compliance coating is deposited in the mold, this coating having a calibrated thickness and at least one visual aspect identifiable by an operator, this coating being intended to cover at least one area of the preform and to be secured thereto by the resin at the end of the step c),
and in that the step e) comprises verifying by the operator of the presence of the aspect in the area, so as to validate the compliance criterion.

The method according to the disclosure thus comprises 5 steps and in particular a preliminary step which is intended to facilitate and optimize the last step of controlling and checking the compliance of the part.

The compliance coating is an additional layer that is intended to be applied to the part specifically to control the compliance of the part. For this purpose, the coating is deposited in the manufacturing mold for the part before the preform is deposited in the mold and the resin is injected into the mold. The resin will then impregnate the preform and ensure the solidification of the part and the bonding of the coating to the part.

This coating is located on one or more areas of the part, in particular the area or areas intended to undergo one or more machining operations. One of the particularities of this coating is that it has a calibrated, i.e. predetermined and constant thickness. Another of its particularities is that it has at least one aspect that is visible to the operator in the controlling step e).

It is thus understood that, during the controlling step e), if the operator visually identifies the appearance of the coating over the entire machined area or areas, this means that the machining operations of this area/these areas have not resulted in a thickness of material removed greater than the calibrated thickness of the coating. It is also understood that this calibrated thickness is equal to the maximum thickness of material that must be removed by machining on the vane and therefore, in this case, the vane complies with this compliance criterion because it has not been negatively affected by the machining operations.

If, during the step e), the operator visually identifies gaps (absences) in the appearance of the coating on the machined area or areas, this means that the machining operations on this area/these areas have resulted in a thickness of material being removed that is greater than the calibrated thickness of the coating and therefore greater than the maximum thickness of material that must be removed by machining on the vane. The vane therefore does not meet the compliance criterion and should be discarded as it may have altered mechanical properties.

The method according to the disclosure may comprise one or more of the following characteristics, taken alone or in combination with each other:
- the coating has a constant thickness of between 10 and 100 μm, preferably between 20 and 60 μm, and more preferably 40 μm;
- the visual aspect is a color or comprises a repetition of a same surface pattern;
- the coating is deposited in the mold by spreading or spraying;
- the coating is selected from a colored paint, a colored resin, a glue film, a cloth, or a combination thereof;
- the cloth is made from glass or carbon fibers, and is preferably woven, and is preferably impregnated with a polymerizable resin;
- the coating comprises at least one polymerizable compound and the polymerization of which is initiated before the step b);
- the coating is deposited on a bottom of the mold;
- the machining is carried out by sandblasting;
- the method comprises, before the step a), a step i) of positioning wedges in the mold, these wedges each having a thickness equal to the calibrated thickness and being intended to define between them a space for depositing the coating, and between the steps a) and b), a step ii) of removing the wedges from the mold;
- the method comprises, between the steps a) and b), a step iii) of at least partially polymerizing the coating;
- the method comprises, between the steps a) and b), a step iv) of checking the thickness of the coating, for example by Eddy Current;
- the part is a vane or a casing.

DESCRIPTION OF THE DRAWINGS

Further characteristics and advantages of the disclosure will become apparent from the following detailed description, for the understanding of which reference is made to the attached drawings in which.

DETAILED DESCRIPTION

Figure 1:
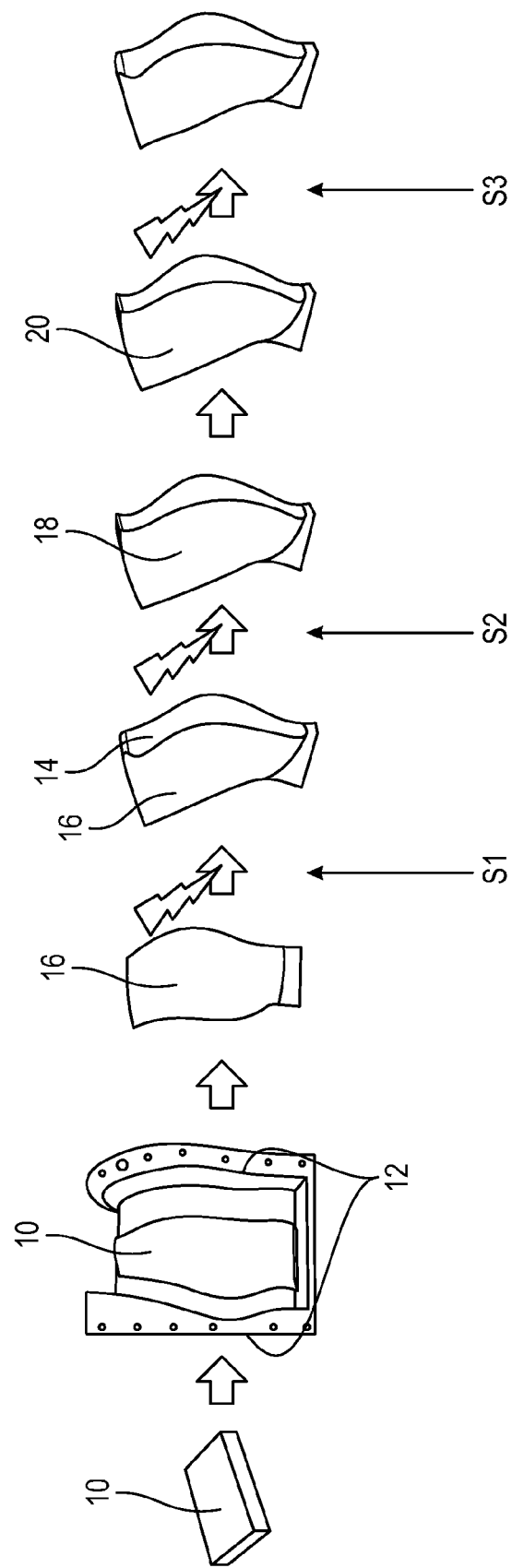
FIG. 1 is a schematic perspective view of a composite aircraft turbomachine vane, which undergoes several operations during a manufacturing method according to the prior art.

FIG. 1 has already been described above.

Figure 2:
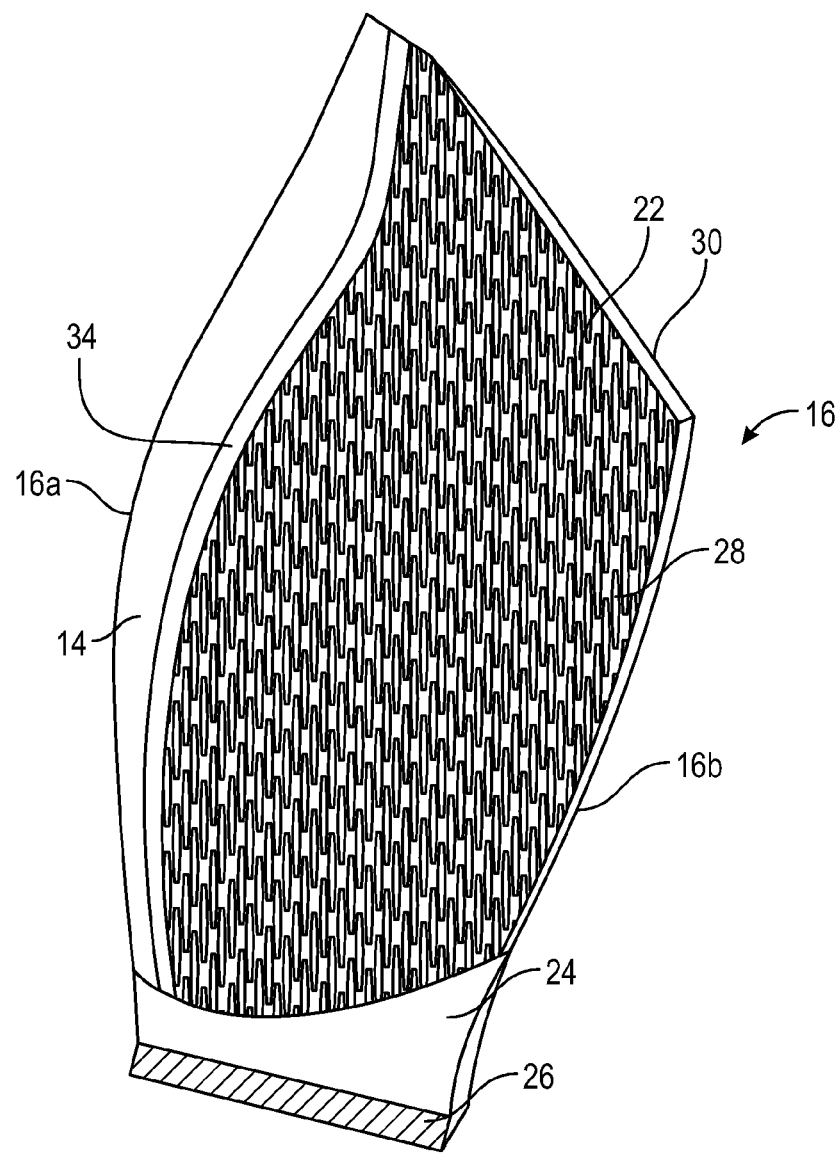
FIG. 2 is a schematic perspective view of a composite aircraft turbomachine vane.

Reference is made to FIG. 2 which illustrates a composite material vane 16 for a turbomachine, this vane 16 being for example a fan or straightener vane of a secondary flow in the case of a turbofan engine.

The vane 16 comprises a blade 22 connected by a stilt 24 to a root 26 which has, for example, a dovetail shape and is shaped to be engaged in a complementarily shaped cell of a rotor disc, in order to retain the vane on this disc.

The blade 22 comprises a leading edge 16a and a trailing edge 16b for the gases flowing through the turbomachine. The blade 22 has a curved or twisted aerodynamic profile and comprises an intrados 28 and an extrados 30 extending between the leading 16a and trailing 16b edges.

The blade 22 is made from a fibrous preform 10 (see FIG. 1) obtained by three-dimensional weaving of fibers, for example carbon.

The leading edge 16a of the blade is reinforced and protected by a metal sheath 14 which is attached to this leading edge 16a. The sheath 14 is for example made of a nickel, cobalt and/or titanium based alloy.

This attachment can be carried out by co-molding the preform 10 with the sheath 14, and on the other hand by gluing the sheath 14 with a glue 34.

Figure 3:
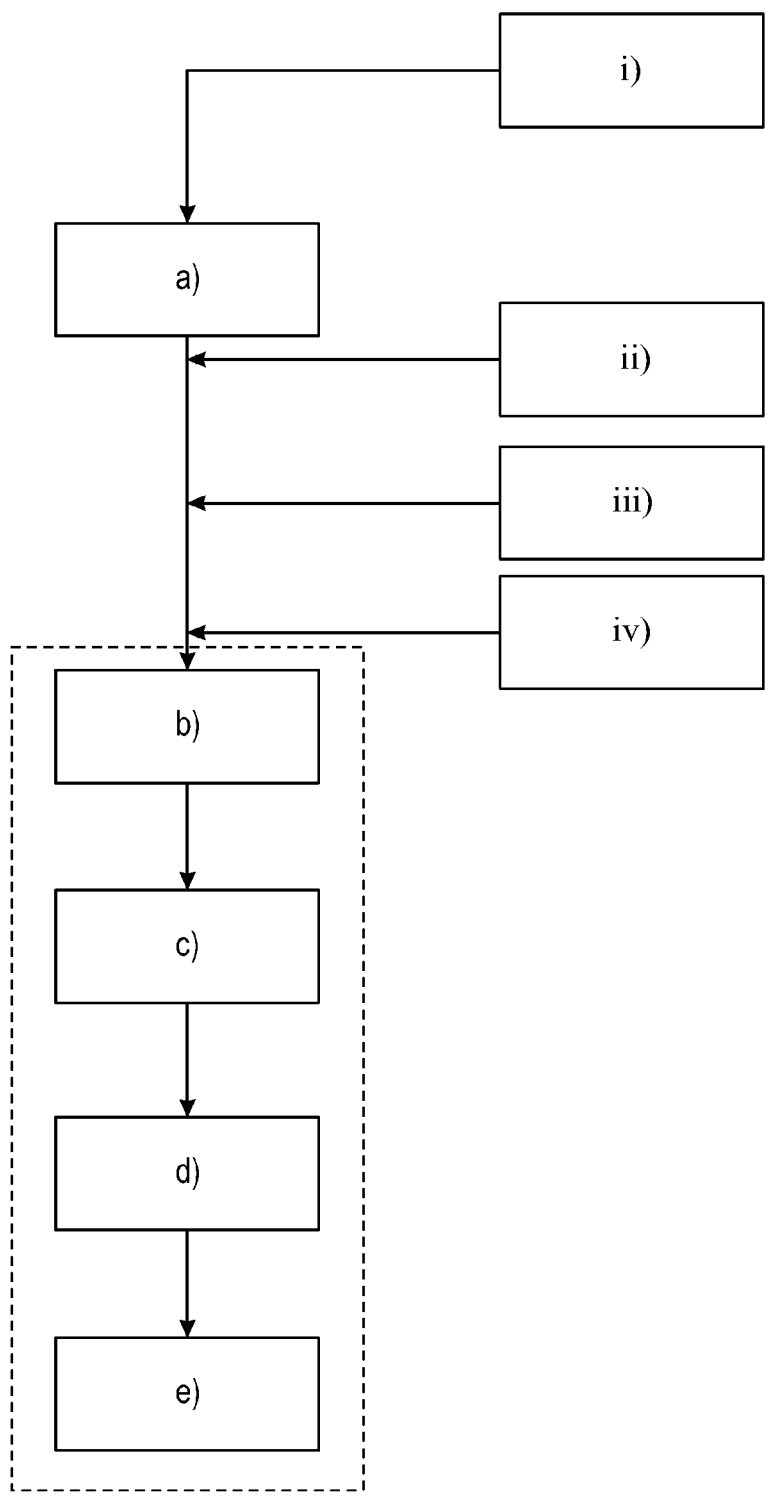
FIG. 3 is a block diagram showing steps of a method according to the disclosure for manufacturing a turbomachine part.

FIG. 3 is a flowchart that illustrates steps in a method for manufacturing a composite vane 16 such as the one shown in FIG. 2.

The steps b) to e), which are surrounded by a dotted rectangle, represent a manufacturing method according to the prior art.

The first step b) of the method of the prior art comprises the production of the fibrous preform 10 by weaving fibers, preferably in three dimensions, using a weaving machine of the Jacquard type for example. The resulting preform 10 is raw and can undergo operations such as a cutting or a compression.

Figure 4:
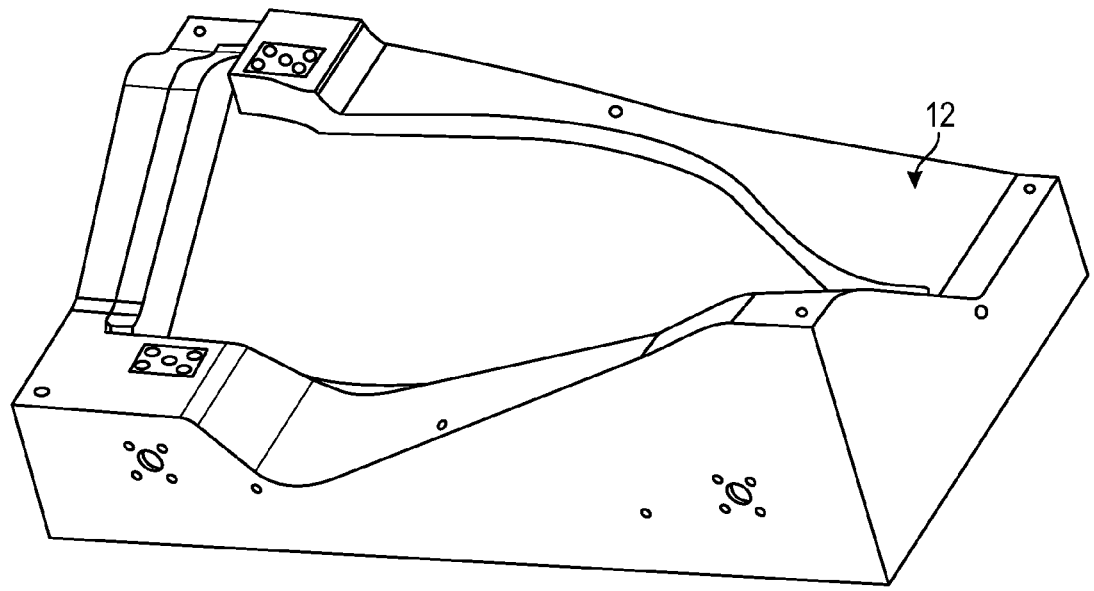
FIG. 4 is a schematic perspective view of a mold for manufacturing the vane of FIG. 2, FIG. 5 comprises highly schematic cross-sectional views of a vane during some of the operations illustrated in FIG. 1, FIGS. 6a and 6b are respectively a schematic perspective and cross-sectional view of a mold of the type shown in FIG. 4, in which a compliance coating in the sense of the disclosure is deposited.

The preform 10 is then arranged in the mold 12 (FIG. 4).

The mold 12 is then closed, for example by means of a counter-mold not shown, and is heated according to a predefined heating cycle to a temperature of preferably between 16° and 200° C. and for example 180° C.

The method comprises a subsequent step c) of injecting polymerizable resin into the mold 12.

The resin injected into the mold 12 is intended to impregnate the preform 10.

The resin is for example an epoxy-based thermosetting resin.

Figure 5:
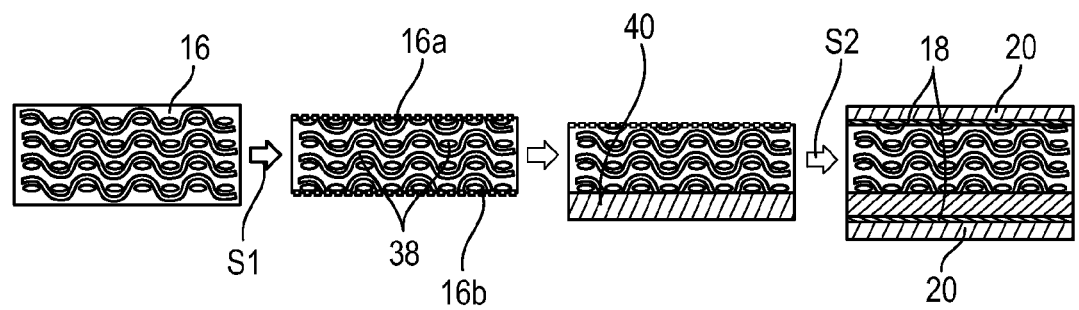

The image on the left in FIG. 5 illustrates the surface state of the vane 16 as it leaves the mold 12.

The method then comprises a step d) of machining the vane 16, preferably by sandblasting. This corresponds to the first sandblasting operation S1 mentioned above and shown in FIG. 1. In the example shown in FIG. 5, the second image from the left shows a vane 16 with both faces, the intrados 16a and the extrados 16b, machined. A thickness of material was removed which exposed some of the fibers 38 of the vane.

The method then comprises a step e) of checking the part by an operator. In the context of the present disclosure, this check is visual and allows to validate at least one compliance criterion according to which the thickness of material removed during the preliminary machining step d) does not exceed a certain threshold which would be critical for the health of the vane.

The sheath 14 can then be fitted and attached by gluing to the edge of the preform 10. The sheath 14 is generally dihedral in shape and defines a groove with V-shaped cross-section into which an edge of the preform is inserted. The glue can be deposited in the groove of the sheath and/or on the edge of the preform 10.

A polyurethane film 40 is then deposited on the vane 16 (on the side of the extrados in the example shown) which then undergoes the second machining operation S2 mentioned above to modify its surface condition and in particular the surface condition of the area of the blade covered by the film 40. A bonding primer 18 and an anti-erosion paint 20 are then deposited to each of the faces of the blade, which then undergoes machining operations S3 of finishing with belt grinding and of grinding.

FIG. 3 shows the additional steps, some of which are optional, prior to the manufacturing method according to the disclosure.

The step b) is thus preceded by a step a) in which at least one compliance coating 50 is deposited in the mold 12. This coating 50 is intended to cover at least one area of the preform 10 and to be secured to it by the resin at the end of the step c).

This coating 50 has a calibrated thickness and at least one visual aspect identifiable by an operator.

It is therefore understood that in the step e), the operator must check for the presence of this particular aspect in the area, so as to validate the compliance of the vane. If this aspect is not visible, it means that the area covered by the coating 50 has been over-machined and the vane should be discarded.

The coating 50 therefore has a calibrated, i.e. controlled, thickness. This means that this thickness is known and constant over the entire length of the coating. This thickness is for example between 10 and 100 µm, preferably between 20 and 60 µm, and more preferably 40 µm.

In the present application, "visual aspect" means a distinguishing sign visible to the naked eye that allows easy identification of the areas of the vane coated with the coating from areas that would not be coated.

In a particular embodiment of the disclosure, this visual aspect is a color, e.g. black, blue, yellow, etc., which is naturally different from the color of the other portions or layers of the vane.

In one variant of embodiment, this visual aspect comprises a repetition of a same surface pattern. The coating may, for example, comprise a herringbone pattern which would be repeated throughout. This pattern could be obtained by a cloth for example, and in particular by a particular weaving pattern of this cloth in the case of a woven cloth. Alternatively, this pattern could be achieved by a printed or marked cloth, this cloth being not necessarily woven.

Figure 6A:
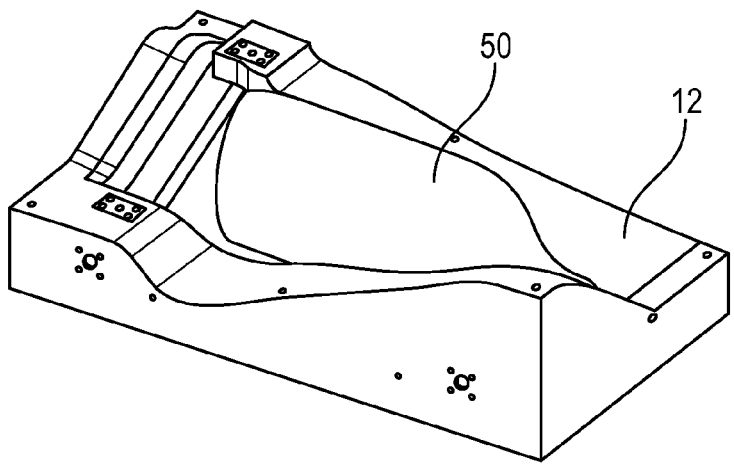
Figure 6B:
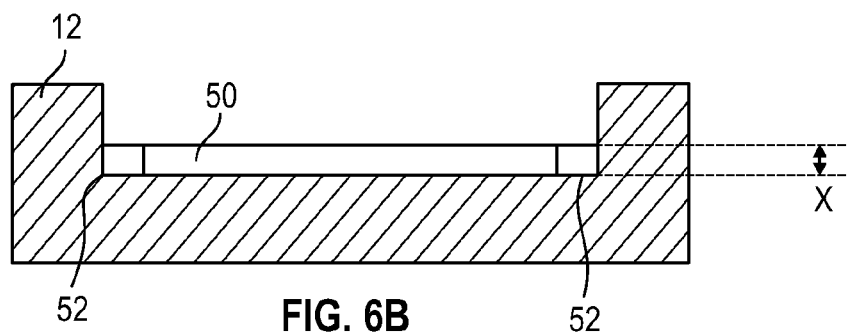

As can be seen in FIGS. 6a and 6b, the coating 50 is intended to be deposited in the mold, for example on the bottom of the mold, by spreading or spraying. FIG. 6b shows the calibrated thickness X of this coating 50.

This calibration can for example be achieved by the steps i) and ii) shown in FIG. 3.

Prior to the step a), the method comprises the step i) of positioning wedges 52 in the mold 12 (FIG. 6b). These wedges 52 each have a thickness equal to the calibrated thickness and are intended to define between them a space for depositing the coating 50.

Between the steps a) and b), the method then comprises the step ii) of removing the wedges 52 from the mold 12.

Depending on the nature of the coating and as will be discussed in more detail below in relation to more concrete examples of embodiments, the coating may comprise at least one polymerizable compound. In this case and in order to limit the displacement and the deformation of the coating 50 during the steps b) and c), an at least partial polymerization of this compound and the coating can be carried out before the step b).

The method in FIG. 3 thus shows, between the steps a) and b), this step iii) of at least partial polymerization of the coating 50. This polymerization can be carried out by heating or baking the coating. This heating or this baking can take place before the coating is deposited in the mold 12 or even afterwards. In the latter case, the mold serves as a support for the coating for this polymerization.

The method in FIG. 3 shows a further optional step iv), between the steps a) and b), of checking the thickness X of the coating 50, for example by Eddy Current.

FIGS. 7a to 10b illustrate several variants of implementation of the manufacturing method.

Figure 7A:
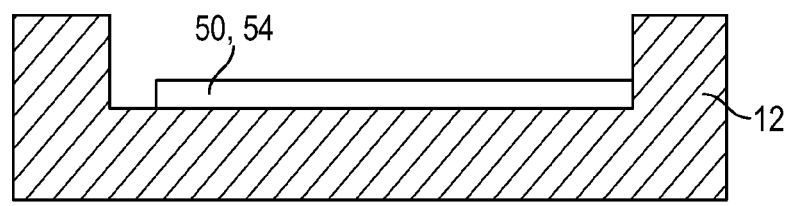
FIGS. 7a and 7b are schematic cross-sectional views of a mold in which a compliance coating is deposited according to two alternative embodiments of the disclosure.
Figure 7B:
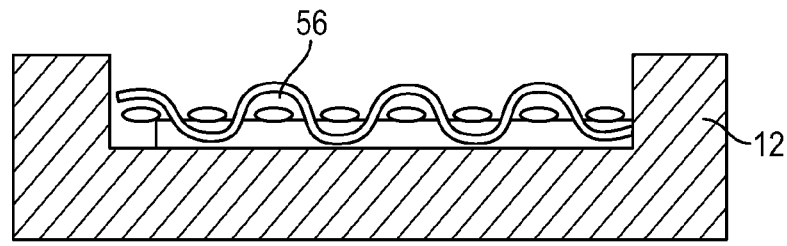

In the variant embodiment shown in FIGS. 7a and 7b, the coating 50 is a paint 54 of a predefined color, which may be reinforced with a cloth 56 of woven or non-woven fibers. The visual aspect to be checked by the operator on the final vane obtained is the color of the paint.

Figure 8A:
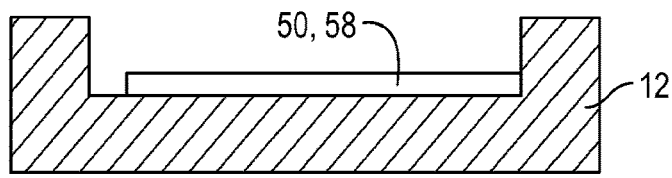
FIGS. 8a and 8b are schematic cross-sectional views of a mold in which a coating comprising a resin in particular is deposited.
Figure 8B:
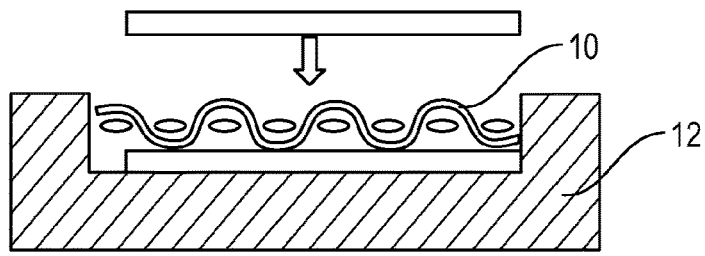

In the variant embodiment shown in FIGS. 8a and 8b, the coating 50 is a resin 58, which may or may not be colored, and which may be reinforced with a woven or non-woven fiber cloth. The visual aspect is the color of the resin and/or the particular weaving pattern of the cloth for example.

Figure 9A:
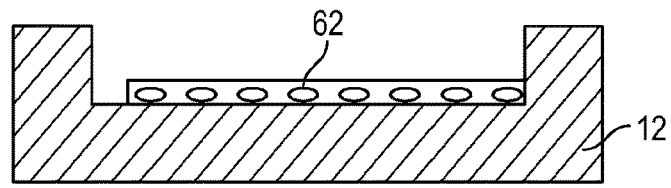
FIGS. 9a and 9b are schematic cross-sectional views of a mold in which a coating comprising a preimpregnated cloth is deposited.
Figure 9B:
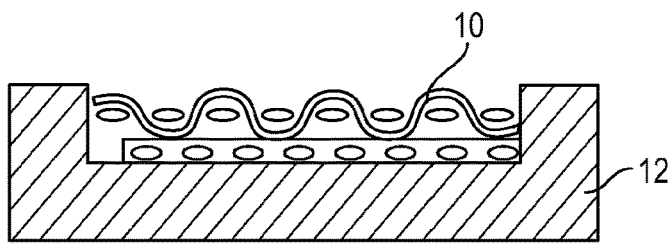

In the alternative embodiment shown in FIGS. 9a and 9b, the coating 50 is a resin pre-impregnated cloth 62 which may be reinforced with an additional fabric. The visual aspect is the color of the cloth 62 or the resin and/or the particular pattern of the fabric for example.

Figure 10A:
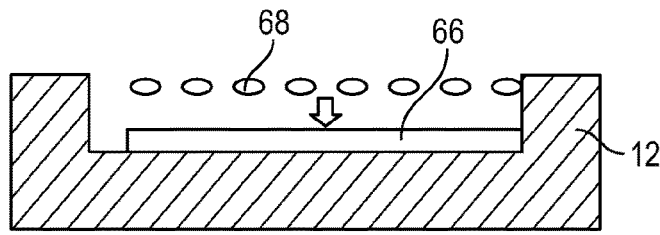
FIGS. 10a and 10b are schematic cross-sectional views of a mold in which a coating comprising a glue in particular is deposited.
Figure 10B:
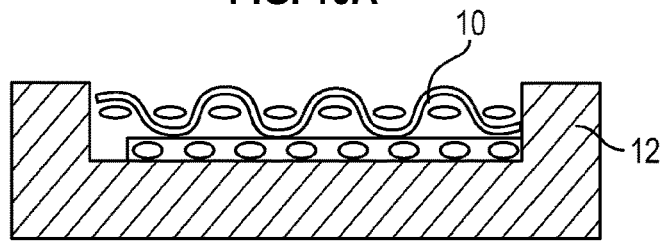

In the variant embodiment shown in FIGS. 10*a* and 10*b*, the coating 50 is a glue 66 which may be reinforced with a cloth and/or a fabric 68. The visual aspect is the color of the glue and/or the particular pattern of the fabric 68 for example.

Figure 11:
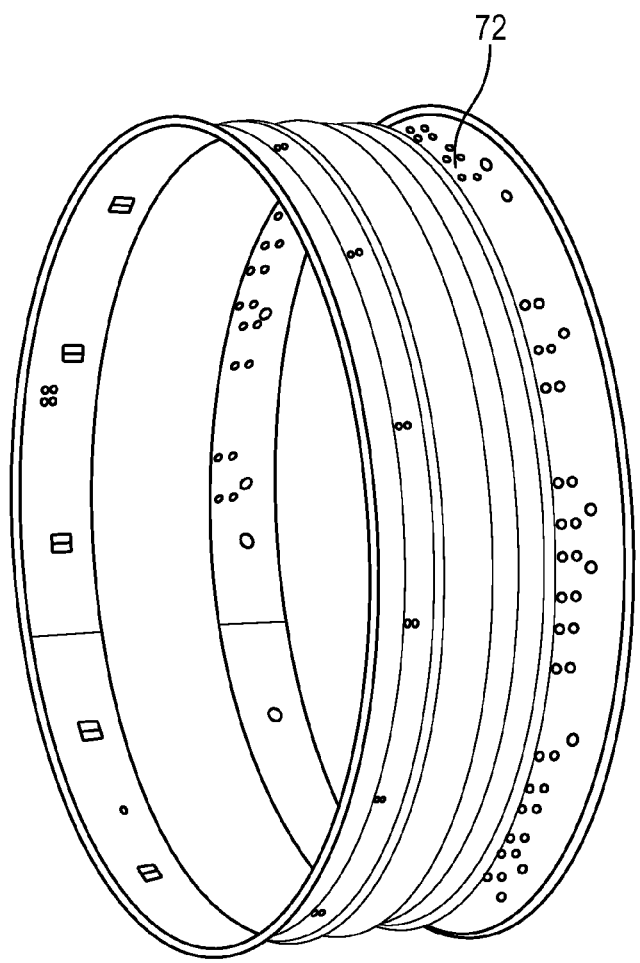
FIG. 11 is a schematic perspective view of a composite aircraft turbomachine casing.

Finally, FIG. 11 shows that the manufacturing method according to the disclosure is not only applicable to a vane but can be applied to other composite parts of a turbomachine, such as a casing 72, for example, as a casing undergoes machining operations, in particular of its external cylindrical surface.

The invention claimed is:

1. A method for manufacturing a part made of composite material for a turbomachine, comprising the steps of:
   b) arranging a preform made by weaving fibers in three dimensions in a mold,
   c) injecting the polymerizable resin into the mold to impregnate the preform so as to form the part after solidification,
   d) machining the part,
   e) visually checking the part by an operator to validate at least one compliance criterion,
   wherein step b) is preceded by a step a) during which at least one compliance coating is deposited in the mold, the compliance coating having a calibrated thickness (X) and at least one visual aspect identifiable by an operator, the compliance coating being configured to cover at least one area of the preform and to be secured thereto by the resin at the end of the step c),
   and wherein step e) comprises verifying by the operator of the presence of said aspect in said area, so as to validate said compliance criterion, and said coating comprises at least one polymerizable compound and the polymerization of which is initiated before the step b).

2. The method according to claim 1, wherein said coating has a constant thickness (X) between 10 and 100 μm.

3. The method according to claim 1, wherein said visual aspect is a color or comprises a repetition of a same surface pattern.

4. The method according to claim 1, wherein said coating is deposited in the mold by spreading or spraying.

5. The method according to claim 1, wherein said coating is selected from a colored paint, a colored resin, a glue film, a cloth, or a combination thereof.

6. The method according to claim 5, wherein the cloth is made from glass or carbon fibers.

7. The method according to claim 1, wherein said coating is deposited on a bottom of the mold.

8. The method according to claim 1, wherein said machining is carried out by sandblasting.

9. A method for manufacturing a part made of composite material for a turbomachine, comprising the steps of:
   b) arranging a preform made by weaving fibers in three dimensions in a mold,
   c) injecting the polymerizable resin into the mold to impregnate the preform so as to form the part after solidification,
   d) machining the part,
   e) visually checking the part by an operator to validate at least one compliance criterion,
   wherein step b) is preceded by a step a) during which at least one compliance coating is deposited in the mold, the compliance coating having a calibrated thickness (X) and at least one visual aspect identifiable by an operator, the compliance coating being configured to cover at least one area of the preform and to be secured thereto by the resin at the end of the step c),
   wherein step e) comprises verifying by the operator of the presence of said aspect in said area, so as to validate said compliance criterion,
   the method further comprising, before the step a), a step i) of positioning wedges in the mold, each of the wedges having a thickness equal to said calibrated thickness and being configured to define between them a space for depositing said coating, and between the steps a) and b), a step ii) of removing the wedges from the mold.

10. The method according to claim 9, further comprising, between the steps a) and b), a step iii) of at least partially polymerizing said coating.

11. The method according to claim 1, further comprising, between the steps a) and b), a step iv) of checking the thickness (X) of said coating.

12. The method according to claim 1, wherein the part is a vane or a casing.

13. The method according to claim 2, wherein said coating has a constant thickness (X) between 20 and 60 μm.

14. The method according to claim 1, wherein said coating has a constant thickness (X) of 40 μm.

15. The method according to claim 6, wherein the cloth is woven.

16. The method according to claim 6, wherein the cloth is impregnated with a polymerizable resin.

17. The method according to claim 11, wherein the step iv) of checking the thickness (X) of said coating is performed by Eddy Current.

18. The method according to claim 1, wherein the method further comprising, before the step a), a step i) of positioning wedges in the mold, each of the wedges having a thickness equal to said calibrated thickness and being configured to define between them a space for depositing said coating, and between the steps a) and b), a step ii) of removing the wedges from the mold.

* * * * *